(12) United States Patent
Drubner

(10) Patent No.: US 9,792,324 B2
(45) Date of Patent: *Oct. 17, 2017

(54) METHOD AND SYSTEM FOR UNIQUELY IDENTIFYING A PERSON TO THE EXCLUSION OF ALL OTHERS

(71) Applicant: Verus Financial, LLC, Waterbury, CT (US)

(72) Inventor: Jeffrey M. Drubner, Waterbury, CT (US)

(73) Assignee: VERUS FINANCIAL, LLC, Waterbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/997,673

(22) Filed: Jan. 18, 2016

(65) Prior Publication Data

US 2016/0132554 A1    May 12, 2016

Related U.S. Application Data

(63) Continuation of application No. 13/630,059, filed on Sep. 28, 2012, now Pat. No. 9,275,412, which is a continuation of application No. 12/812,260, filed as application No. PCT/US2009/030653 on Jan. 9, 2009, now Pat. No. 8,306,970.

(60) Provisional application No. 61/020,467, filed on Jan. 11, 2008.

(51) Int. Cl.
G06F 17/30    (2006.01)
G06Q 30/08    (2012.01)

(52) U.S. Cl.
CPC ....... *G06F 17/30424* (2013.01); *G06Q 30/08* (2013.01)

(58) Field of Classification Search
CPC combination set(s) only.
See application file for complete search history.

(56) References Cited

U.S. PATENT DOCUMENTS

| 5,895,465 A | 4/1999 | Guha |
|---|---|---|
| 6,108,651 A | 8/2000 | Guha |
| 6,963,871 B1 | 11/2005 | Hermansen et al. |
| 6,968,348 B1 | 11/2005 | Carone et al. |
| 7,054,833 B1 | 5/2006 | McDonald |
| 7,254,557 B1 | 8/2007 | Gillin et al. |

(Continued)

*Primary Examiner* — Shyue Jiunn Hwa
(74) *Attorney, Agent, or Firm* — DeLio, Peterson & Curcio, LLC; Kelly M. Nowak

(57) ABSTRACT

Methods, program products, computer program products and systems for uniquely identifying an individual within a population to the exclusion of all others within the population by comparing data from unique data sources based on the name of the individual for providing a collection of preliminary suspects. An individual search service provider is then searched for additional data relating to the collection of preliminary suspects to locate any potential matches, which are reconciled with data from the unique data sources to locate at least a portion of a unique identifier that may be associated with the individual. The potential matches and portion of the unique identifier are compared with other data records within the individual search data source for locating a complete unique identifier that may be associated with the individual, followed by determining whether or not this complete unique identifier uniquely identifies the individual.

18 Claims, 6 Drawing Sheets

(56) References Cited

U.S. PATENT DOCUMENTS

| | | |
|---|---|---|
| 7,257,206 B2 | 8/2007 | Janveja et al. |
| 7,269,579 B2 | 9/2007 | Lovegren |
| 7,275,110 B2 | 9/2007 | Umbreit |
| 7,278,026 B2 | 10/2007 | McGowan |
| 7,403,922 B1 | 7/2008 | Lewis et al. |
| 8,423,563 B2 | 4/2013 | McPeake et al. |
| 2003/0004787 A1 | 1/2003 | Tripp et al. |
| 2004/0098339 A1* | 5/2004 | Malek ................... G06Q 20/00 705/44 |
| 2004/0220918 A1 | 11/2004 | Scriffignano et al. |
| 2004/0260657 A1* | 12/2004 | Cockerham ............. G06F 21/31 705/76 |
| 2005/0091587 A1 | 4/2005 | Ramarao et al. |
| 2005/0149527 A1 | 7/2005 | Berlin et al. |
| 2007/0239683 A1 | 10/2007 | Gallagher |
| 2008/0005106 A1* | 1/2008 | Schumacher ..... G06F 17/30489 |
| 2008/0147588 A1* | 6/2008 | Leffingwell .............. G06N 5/02 706/48 |

* cited by examiner

METHOD AND SYSTEM FOR UNIQUELY IDENTIFYING A PERSON TO THE EXCLUSION OF ALL OTHERS

CROSS REFERENCE TO RELATED APPLICATIONS

This application is a continuation application of U.S. Ser. No. 13/630,059, filed Sep. 28, 2012, which is a continuation application of U.S. Ser. No. 12/812,260, filed Jul. 9, 2010 and issued as U.S. Pat. No. 8,306,970, which is a National Phase filing under 35 U.S.C. 371 of PCT/US2009/030653 which was filed Jan. 9, 2009 which claims priority from U.S. provisional application Ser. No. 61/020,467 filed Jan. 11, 2008.

BACKGROUND OF THE INVENTION

1. Field of the Invention

The present invention relates to methods, systems and program products for singularly and uniquely identifying an individual within a given population.

2. Description of Related Art

There are millions of people in various populations around the world. For instance, the United States of America ("USA") currently has more than 300 million living people in its population. Most, if not all, of USA's population have digital records that correspond to and can identify or partially identify each individual (i.e., person) within its population. These digital records can include, for instance, a person's first, last and middle name, address(es), date of birth, telephone number(s), social security account number ("SSN"), as well as other identifying data used within the USA or throughout other countries. In addition to the foregoing, death records are also digitally stored. To date there are over 80 million digitally stored death records in the USA alone. All of these digital records, of both living and deceased individuals, are stored in large-capacity public and private electronic databases for electronic search. The digital records of both those living and deceased within a population is referred to hereinafter as the "digitized population." As such, there exists a plethora of digital records of the USA digitized population, with nearly 380 million or more digital records, that can be searched and data gathered from numerous public and private databases.

Often times there is a need to singularly identify a person within a population, to the exclusion of all others, within such population. For instance, a person may need to be identified and distinguished from others for purposes of financial approvals, fraud prevention, genealogical research, law enforcement, medical reasons, amongst various other purposes a person may need to be uniquely identified.

Current methods of uniquely identifying an individual from all others in a population exhibit many errors due to the commonality of first and last name pairings. For instance, in the USA a significantly large portion of its population share a first and last name combination with at least one or more individuals within such population both alive and or deceased. Of this name sharing population, a significant portion thereof also share the same exact birth date or even address, and the like, with one or more other individuals having the same first and last name pairing. The number of people within a population that share the same name, and potentially the same birth date or some other common factor, further increases when factors such as name changes due to marriage and divorce, nick names, misspellings, and people who use their middle name as their first name are taken into account.

To date, the most accurate approach for uniquely identifying an individual within a given digitized population is through the use of a Social Security Number ("SSN"). The prior art is replete with references disclosing tracking or locating individuals through digital records based on the use of a SSN at the beginning searching stage. A SSN is a unique marker that identifies individuals within a given population without duplication of any SSNs. However, a large portion of digitized records do not contain SSN's, or contain inaccurate SSN's, or any other wholly unique marker for singularly and uniquely identifying a person to the exclusion of all others. As stated above, these records may contain some information beyond a first and last name pairing. The problem is that absent the use of a SSN in initially searching for an individual, the prior art fails to address the need to accurately and singularly identify individuals within a digitized population when a unique identifier, such as a SSN, is not initially available.

SUMMARY OF THE INVENTION

Embodiments of the invention are directed to methods for positively identifying an individual by providing the name of an individual to be uniquely identified within a population to the exclusion of all others within the population. At least two different and unique sources of data that contain data pertaining to the population are provided as well as access to at least one individual search data source. Data from these two different and unique sources of data are compared against each other based on the name of the individual to provide a collection of preliminary suspects. At least one individual search data source is searched for additional data relating to the collection of preliminary suspects for locating at least one potential match, which is then verified and validated. This potential match is then reconciled with data from at least one of the different and unique data sources for locating at least a portion of a unique identifier that may be associated with the individual that is to be uniquely identified. The potential match and the portion of the unique identifier are then compared with other data records within the individual search data source for locating a complete unique identifier that may be associated with the individual that is to be uniquely identified. It is then determined whether or not the complete unique identifier uniquely identifies the individual to the exclusion of all others within the population.

Other embodiments of the invention are directed to method, program products, computer program products and systems for implementing the one or more methods of the invention.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF PREFERRED EMBODIMENT(S)

Figure 1:
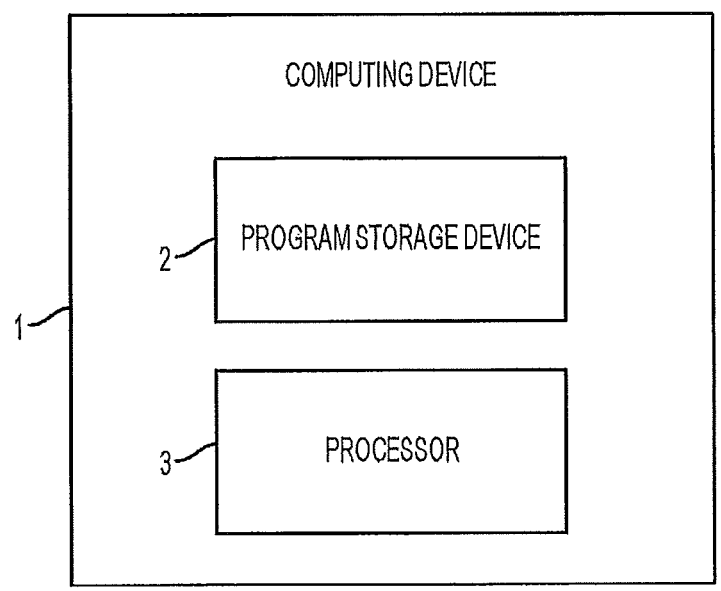
FIG. 1 is a block diagram of a computing device incorporating a programs storage device and a processor for implementing the one or more embodiments of the invention.

In describing the preferred embodiments of the present invention, reference will be made herein to FIGS. 1-5 of the drawings in which like numerals refer to like features of the invention.

Various automated analyses exist for identifying and tracking individuals through public records. These public records are typically created when individuals conduct financial or government transactions. Each time a person conducts a transaction, (i.e. applying for a loan or making a filing with a government entity) they leave behind a record that can later be used to identify certain information about or associated with that particular person. In present times, most if not all of these records, are electronically digitized. This record digitization creates what is referred to as "digital footprints" of that individual. The more digital footprints a particular person leaves behind, the more information can be searched, identified and accumulated on that person.

However, a problem with known identifying and tracking systems is that, in using these digital footprints, if the starting point record (i.e. the first digital footprint analyzed) does not contain enough information to uniquely identify that individual to the exclusion of all others (i.e., it is a non-unique digital footprint) then that particular footprint can not be attributed to one unique person and is therefore of little use in such analyses. The present invention provides methods, systems and program products that uniquely associate one or more of these non-unique digital footprints with other non-unique footprints, and using the accumulations and groupings of these non-unique footprints provides a unique identification of an individual(s) to the exclusion of all others.

One or more embodiments of the invention are directed to methods, apparatus and systems for singularly and uniquely identifying an individual within a given population to the exclusion of all other individuals within such population. An identification of a selected individual, or a group of individuals, within a population or data set of people for which it is desired that such individual(s) be electronically identified down to the actual, true individual(s) to the exclusion of all others within such population or data set of people. In so doing, each embodiment of the invention verifies that a located electronic identification of the selected individual(s) being searched for is (i.e., correctly matches to) the actual biological person himself/herself by excluding all other electronic matches to such person for the later use of this located electronic identification.

The various embodiments of the invention may be embodied as a computer program product stored on a program storage device. These program storage devices may be devised, made and used as a component of a machine utilizing optics, magnetic properties and/or electronics to perform the method steps of the one or more embodiments of the invention. Program storage devices include, but are not limited to, magnetic diskettes, magnetic tapes, optical disks, Read Only Memory (ROM), RAM, floppy disks, a hard disc drive and the like. The methods of the invention may also be distributed using transmission-type media, such as, digital and analog communication links. A computer readable program code means in known source code may be employed to convert the methods described below for use on a computer. In one or more embodiments, the computer programs or software incorporating the process steps and instructions described further below may be stored in any conventional computer, for example, that shown in FIG. 1. Computer 1 incorporates a program storage device 2 and a processor 3. Installed on the program storage device 2 is the program code incorporating the methods of the present invention as well as any database information for uniquely and singularly identifying a certain individual from a population or large group or sub-group of individuals.

Figure 2:
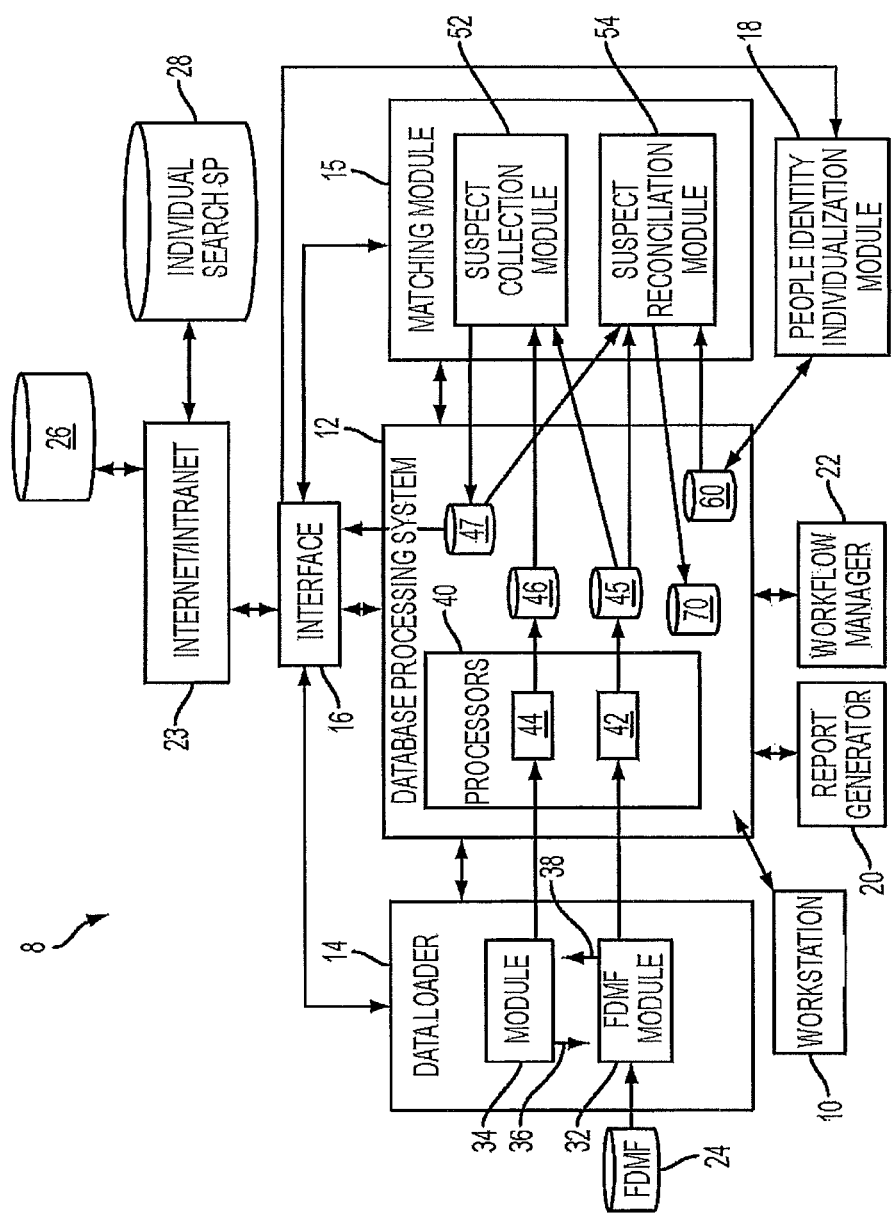
FIG. 2 is a block diagram showing the system components and processes for singularly and accurately identifying an individual to the exclusion of all others in a population in accordance with one or more embodiments of the invention.
Figure 3A:
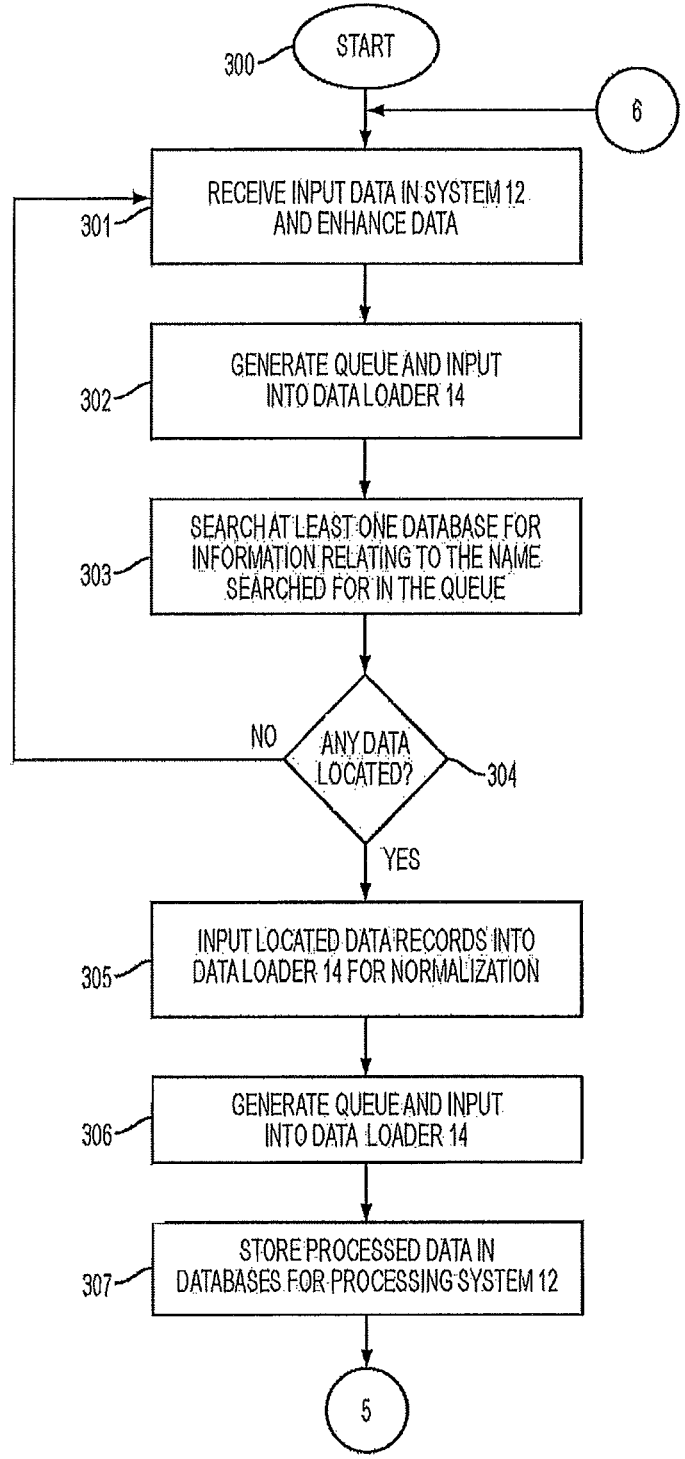
FIGS. 3A and 3B are a process flow of singularly and accurately identifying an individual to the exclusion of all others in a population in accordance with one or more embodiments of the invention.
Figure 3B:
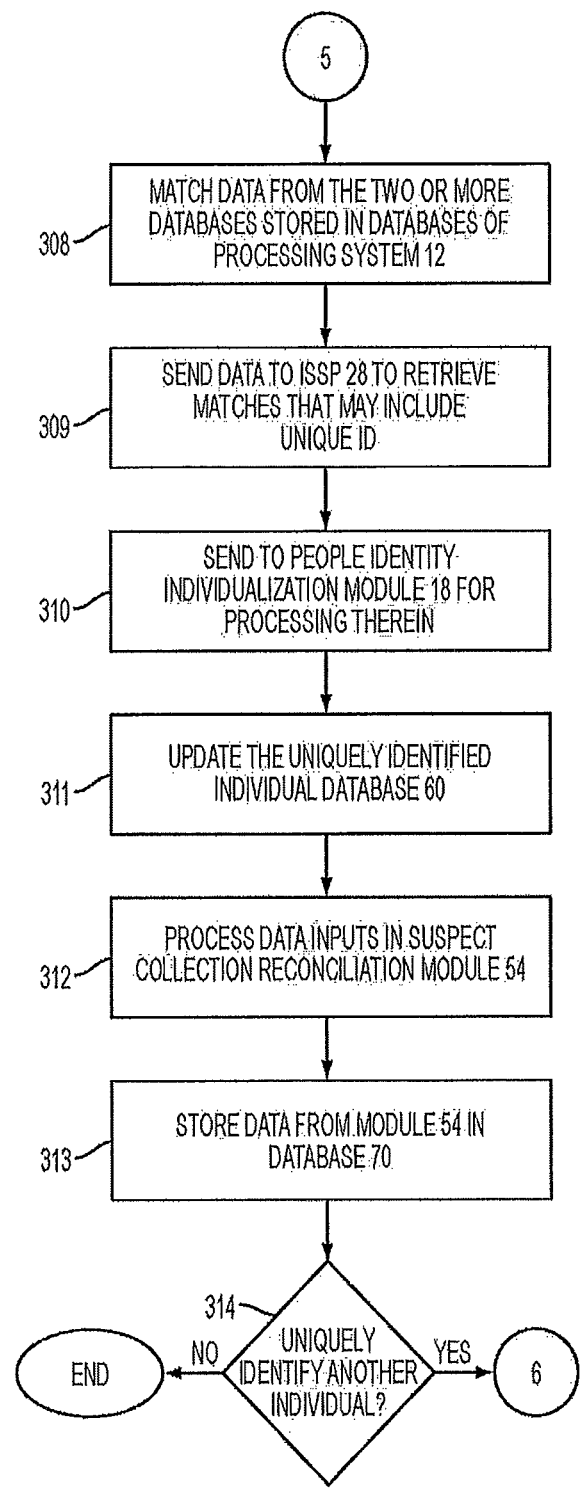

While FIG. 2 shows a schematic representation of one embodiment of the methods and components of the invention, it should be appreciated that many embodiments of the invention exist while not deviating from the novel methods and components as described herein. The one or more embodiments of the invention include a system 8 for uniquely and singularly identifying a selected individual, or potentially even a set of individual(s), from a population or large data set of people.

System 8 includes a workstation (i.e., client computer) 10, a database processing system 12, a data loader module 14, and a data normalization and matching module 15. The workstation 10 may be any known computing device (e.g., a client computer) that a user of the invention can input and receive information or data in accordance with the various aspects of the invention. For instance, a user may input data relating to an individual to be located or identified down to the actual precise biological person himself/herself (i.e., to the exclusion of all other people), whereby such data is input at workstation 10 and then input into database processing system 12 of system 8. The various components of system 8 process this data to locate and obtain an accurate electronic identification of the precise biological person himself/herself, which is then output from database processing system 12 to workstation 10 for receipt by the user. In one or more embodiments, the workstation includes a display screen for viewing the various results and reports of the invention, as described in detail below.

The database processing system 12 is in electronic data communication with both the data loader module 14, the data normalization and matching module 15 and people identity individualization module 18, all of which are described in detail below, as well as with various other data processing modules. The system 8 also includes an interface 16 (i.e., data integration engine) that is in communication with either the Internet or an Intranet 23 for transmitting data thereto, and for receiving data from various databases accessible via the Internet/Intranet 23 for processing in accordance with the embodiments of the invention.

The system further includes an Analytic and Workflow Manager Module 22 and an Operational Report Generator 20, both in electronic data communication with database processing system 12, for supporting the operation and administration of the various embodiments of the invention. The Workflow Manager Module 22 implements business processes and work stream management of the various embodiments of the invention. It controls the management and monitoring of the batch progression of the invention. This may be accomplished using known management tools (e.g., Oracle Business Process Execution Language (BPEL) Process Manager).

The Analytic and Operational Report Generator 20 generates both standard reports and operational reports for use by both the system 8 and for display to the user of the invention. This may be accomplished using known report and query tools (e.g., Oracle Discover™ or Oracle Business Intelligence Publisher™). As described in more detail below, the standard reports may include, but are not limited to, File reports (e.g., Federal Death Master (FDM) file reports), Data Validation and Verification reports (e.g., FDM Transaction Data Validation and Verification reports), "Suspect Collection" Identification Listing reports, "Suspect Collection" Reconciliation Listing reports, Individual Search Service Provider (ISSP) Result File Listing reports, and the like. Operational reports include those reports that are used by system 8 and/or by users of the system 8 to track and manage data loads, refresh cycle executions, execute the individualization procedures, as well as other system operations in accordance with the various embodiments of the invention. For instance, operational reports may include, but are not limited to, Data Load Status and Statistics reports, Refresh Cycle Execution reports, Web Service Interface Operation reports, People Identity Individualization Execution Result and Statistics reports, System Error Listing reports, and the like.

For ease of understanding the invention, the below process flow is described in relation to FIGS. 2-5, however, it should be appreciated and understood in accordance with the foregoing description of the invention that other process flows may be implemented for carrying out the present invention.

Step 300.

Start the process flow by a user inputting data relating to an individual (or individuals) that is to be electronically located and/or identified from a given population down to the actual precise person himself/herself to the exclusion of all other people within such population. This data is input by a user at the workstation 10 and transmitted to the database processing system 12 for processing. This information initially includes at least the first name and last name of the individual, along with an address believed to be associated with such individual. This address may be an address at which it is believed or known that such individual currently resides or formerly resided. The process flow goes to step 301.

Step 301.

The input data corresponding to the individual that is to be uniquely and singularly identified is first processed within a data processing module 40 of database processing system 12. The data processing module 40 contains one or more processors (e.g., processors 42 and 44) that each translate, validate, verify and scrub the incoming data files. In so doing, the data processing module 40 translates the first and last names and/or address into codes recognized by system 8. Once translated into recognizable codes, the data processing module 40 also validates and verifies the incoming data by making sure that all input data fields contain at least one meaningful value. These validation and verification processes are performed to prevent any erroneous data from entering the database processing system 12. For instance, making sure that the first and last name fields contain at least one alphabetic letter, or making sure that the input address field contains at least one letter and/or number.

Processors of the data processing module 40 also perform a data scrubbing operation to the input data corresponding to the individual being search for to maximize the quality of such data input prior to input into database processing system 12. This data scrubbing operation is a "data replacement" operation that is performed on the first and last name data fields, and on the address field. In one embodiment of the invention, the scrubbing enhances the input first and last name data fields by capitalizing all characters in any "name field", compressing two or more consecutive blank spaces into one single blank character, removing all punctuation marks in any name, removing all title specifications (e.g., MR, MRS, MS, DR, etc.), removing all suffix specifications (e.g., II, JR, $2^{nd}$, etc.) and placing the same into the "SUFFIX" field in a Standardized Template, removing all numeric characters, and the like. Likewise, scrubbing is also performed on the input address fields (i.e., street number, street address, city, state, ZIP code, country code, etc.) to enhance such data. Once the input data is enhanced, the process flow continues to step 302.

Step 302.

All of the enhanced data in the data processing module 40 is then provided in a dispatch queue for obtaining potential matches for the individual being searched for (i.e., the individual that is to be uniquely and singularly identified from a given population). The given population may be a complete population (e.g., the U.S.A. population), a sub-population (e.g., the population of the state of New York), or even a sub-set of a sub-population (e.g., the population within New York City). The queue includes a variety of search terms relating to the individual that is to be searched for in the databases including, but not limited to, the enhanced data name fields, enhanced data address fields, as well as other specific search term requests. In one or more embodiments, the specific search term request of a "No Other Person Request" is included within the queue for determining whether there is no other individual(s) within the searched population that can be the individual that is being searched for since this person is the only one with the name fields and/or address combination being searched. The process flow continues to step 303.

Step 303.

The queue is then uploaded to the Internet/Intranet 23, via interface 16, or even through data loader 14 and then through interface 16, for retrieving search results from a variety of accessible databases 26 et al. on the Internet/Intranet 23. The queue may also be loaded into databases 24 running at or on workstation 10, whereby such databases 24 may be proprietary and contain confidential information. As such, these types of databases are run at or on workstation 10 using computing compatible media, such as, a CD, DVD, CD-ROM, etc., and not over the Internet or intranet. For instance, Federal Death Master File Databases (FDMF) 24 contain confidential information regarding a person's identity (e.g., SSN, DOB, etc.), or even proprietary credit card databases which also include confidential information (e.g., credit card numbers, SSN, DOB, etc.).

In accordance with one or more embodiments of the invention, at least one of the databases searched is a Federal Death Master File Database (FDMF) 24. The Federal DMF database 24 contains numerous files, some of which contain confidential information, and is maintained by the Social Security Department. This data source is used in both "full load," with at least 79 million records, and in "delta updates," which are monthly updated formats. Thus, the Federal DMF is loaded one time only for the full load and then monthly for updates.

Figure 4:
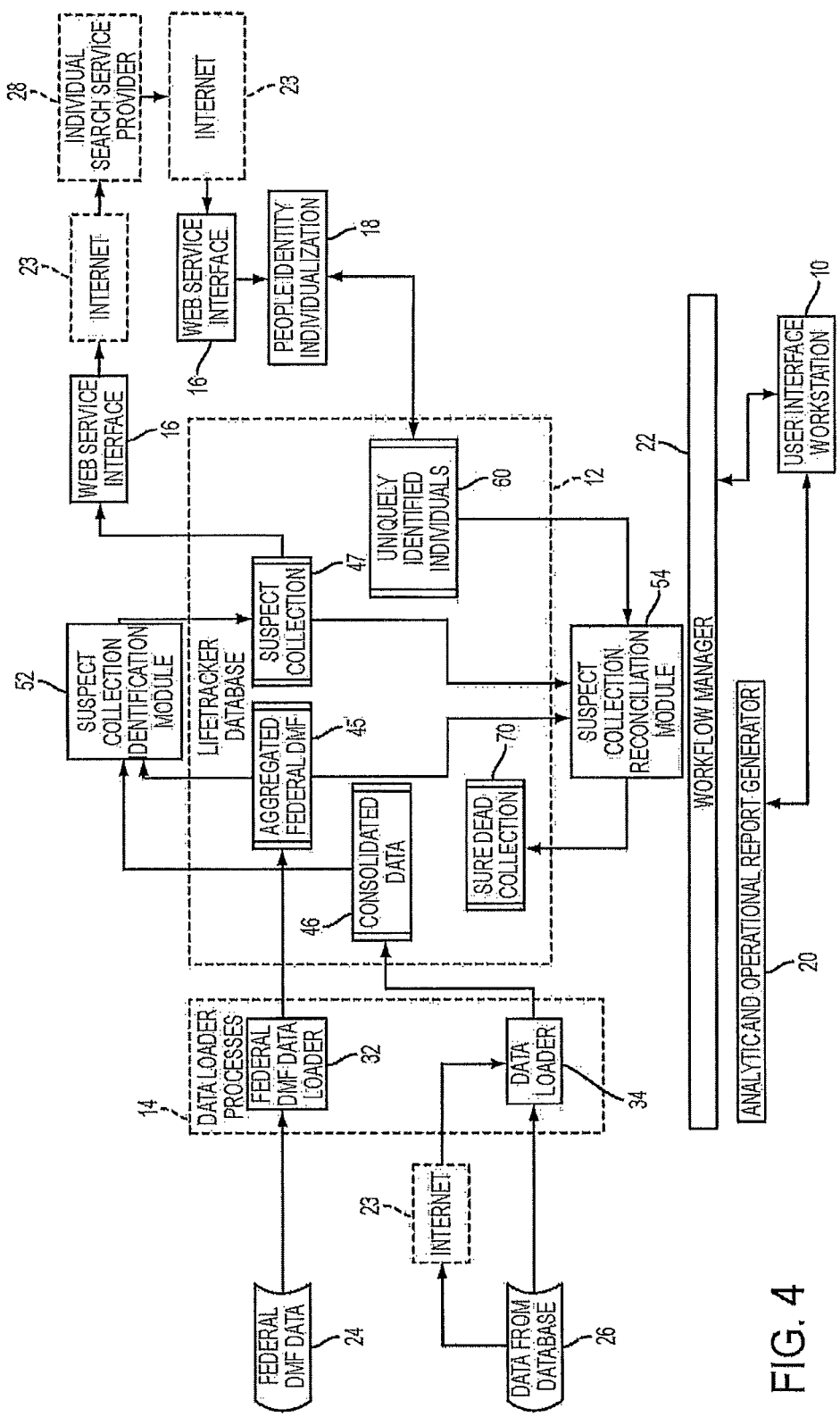
FIGS. 4 and 5 are block diagrams showing one preferred embodiment of the system components and process flow of singularly and accurately identifying an individual to the exclusion of all others in a population in accordance with the invention.
Figure 5:
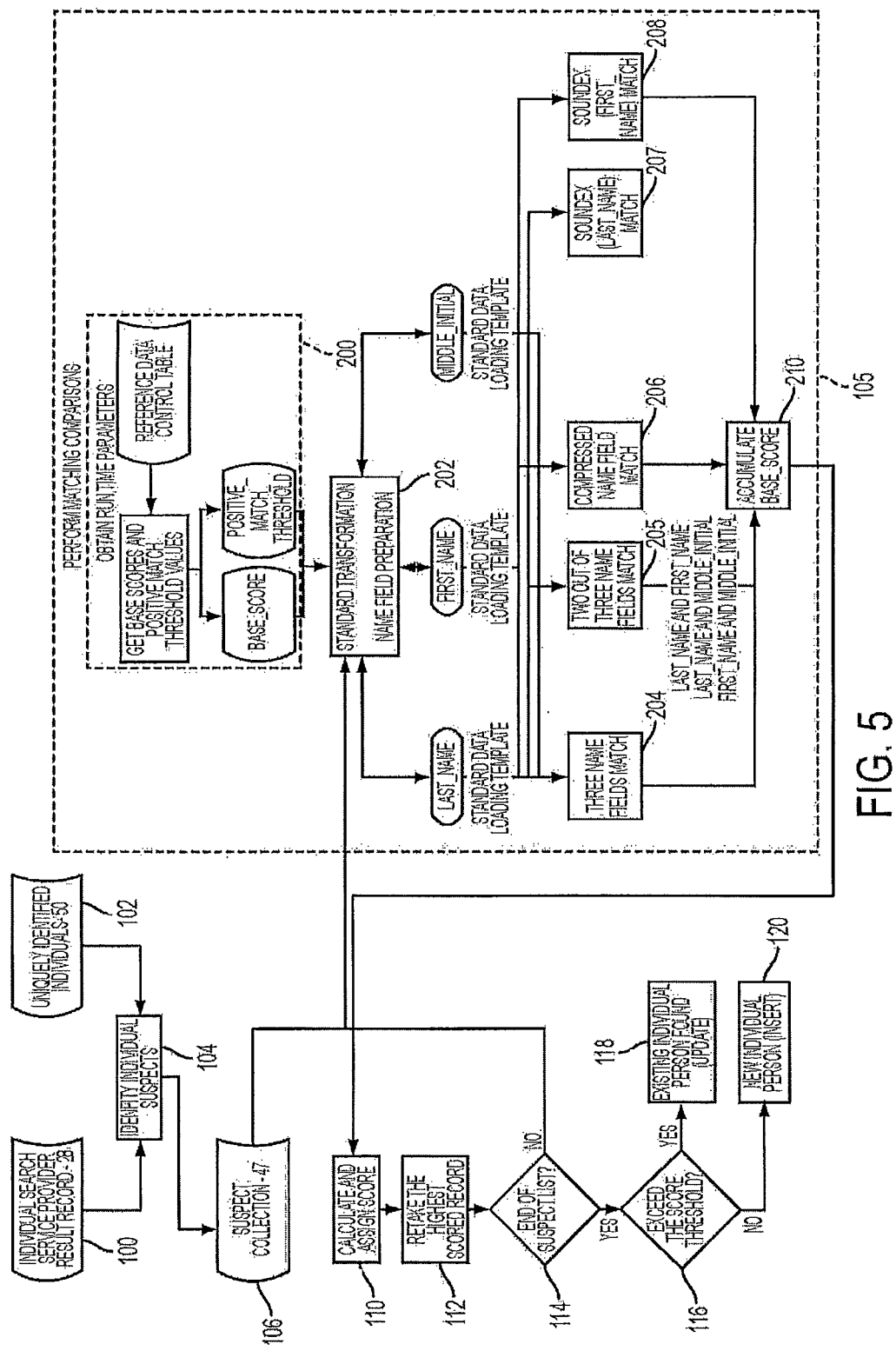

FIGS. 4 and 5 show schematic diagrams of the components and process flow of one preferred embodiment of the invention that searches for data relating to the individual that is to be uniquely and singularly identified. In so doing, the queue containing the first and last name fields and at least one potential known address of such individual is input into both the FDMF 24 running at workstation and into Database 26 running on the Internet or an intranet. The process flow continues to step 304 to search these databases for locating any potential matches based on the input queue. Go to step 304.

It should be appreciated and understood that the various embodiments of the invention are not limited to the schematics of FIGS. 4 and 5. Rather, the invention is applicable to any situation wherein it is required that an individual(s) be uniquely and singularly identified to the precise biological person to the exclusion of all others in the population that is being searched. For instance, one or more embodiments may be used to uniquely and singularly identifying an individual(s) to the exclusion of all others in the population for purposes of unclaimed property, credit card approvals and/or usage, fraud prevention, identity theft, financial matters, money laundering, monetary payments and/or debts, law enforcement, medical reasons, genealogical research, amongst various other purposes a person may need to be uniquely identified. As such, the propriety databases 24 and/or publicly available databases 26 may include both confidential and non-confidential information that uniquely identifies each individual (i.e., unique markers) including, but not limited to, SSN, DOB, a property owner tax ID number, a citizenship number, tax ID number, driver's license number, U.S. passport, birth certificate, government certified document that identifies an individual, and the like, or even combinations of or portions thereof any of the foregoing unique markers.

Step 304.

It is then determined whether or not any search results were located in databases 26 input from the Internet/Intranet 23 or other databases 24 that may be proprietary and, as such, input into the system from a disc, CD-ROM, etc. If no search results were located, the process flow returns back to Step 301, or alternatively, the process ends. Wherein the process flow recycles back to Step 301, the data processing module 40 receives notice that no search results were found (i.e., no external data files were located). The input data corresponding to the individual that is to be uniquely and singularly identified is then reprocessed to correct for any translation, validation, verification and/or scrubbing errors that may have occurred, and the process flow continues to step 302. However, if it has been determined that data file search results were located in the databases 24, 26, etc., then the process flow continues to step 305.

Step 305.

The located data file search results from databases 24, 26, etc. are input into the data loader component 14 component via interface 16. These external data files of search results are input into data loader modules of the data loader component 14, such as, data loader modules 32 and 34, to normalize and filter this input data for entry into database processing system 12. Each data loader module is configured with a standard template and a translation table. The standard templates normalize all disparate incoming data formats from the various database inputs into one standardized format that is recognized and used by database processing system 12.

In the event there is any corrupted data files, any incompatible data files, any data load exceptions or rejections, or any data format errors encountered within the incoming data files, the data loader modules 32, 34, etc., output these data errors in log files to the user at workstation 10. These log files safeguard the database processing system 12 from unnecessary resource consumption. The user may input appropriate commands to generate a report based on these log files for examination and determination of whether or not such files contain exceptions, rejected data or true log files. At the user's discretion, the user may then manually enter such data from workstation 10 into database processing system 12 for processing. A runtime error threshold parameter can be specified to abort the data load process if a number of data format errors exceeds the parameter. An excessive number of data format errors generally indicate a corrupted file or changes in the incoming file format.

System 8 includes a workstation (i.e., client computer) 10, a database processing system 12, a data loader module 14, and a data normalization and matching module 15. The workstation 10 may be any known computing device (e.g., a client computer) that a user of the invention can input and receive information or data in accordance with the various aspects of the invention. For instance, a user may input data relating to an individual to be located or identified down to the actual precise biological person himself/herself (i.e., to the exclusion of all other people), whereby such data is input at workstation 10 and then input into database processing system 12 of system 8. The various components of system 8 process this data to locate and obtain an accurate electronic identification of the precise biological person himself/herself, which is then output from database processing system 12 to workstation 10 for receipt by the user. In one or more embodiments, the workstation includes a display screen for viewing the various results and reports of the invention, as described in detail below.

The database processing system 12 is in electronic data communication with both the data loader module 14, the data normalization and matching module 15 and people identity individualization module 18, all of which are described in detail below, as well as with various other data processing modules. The system 8 also includes an interface 16 (i.e., data integration engine) that is in communication with either the Internet or an Intranet 23 for transmitting data thereto, and for receiving data from various databases accessible via the Internet/Intranet 23 for processing in accordance with the embodiments of the invention.

The system further includes an Analytic and Workflow Manager Module 22 and an Operational Report Generator 20, both in electronic data communication with database processing system 12, for supporting the operation and administration of the various embodiments of the invention. The Workflow Manager Module 22 implements business processes and work stream management of the various embodiments of the invention. It controls the management and monitoring of the batch progression of the invention. This may be accomplished using known management tools (e.g., Oracle Business Process Execution Language (BPEL) Process Manager).

The Analytic and Operational Report Generator 20 generates both standard reports and operational reports for use by both the system 8 and for display to the user of the invention. This may be accomplished using known report and query tools (e.g., Oracle Discover™ or Oracle Business Intelligence Publisher™). As described in more detail below, the standard reports may include, but are not limited to, File reports (e.g., Federal Death Master (FDM) file reports), Data Validation and Verification reports (e.g., FDM Transaction Data Validation and Verification reports), "Suspect Collection" Identification Listing reports, "Suspect Collection" Reconciliation Listing reports, Individual Search Service Provider (ISSP) Result File Listing reports, and the like. Operational reports include those reports that are used by system 8 and/or by users of the system 8 to track and manage data loads, refresh cycle executions, execute the individualization procedures, as well as other system operations in accordance with the various embodiments of the invention. For instance, operational reports may include, but are not limited to, Data Load Status and Statistics reports, Refresh Cycle Execution reports, Web Service Interface Operation reports, People Identity Individualization Execution Result and Statistics reports, System Error Listing reports, and the like.

For ease of understanding the invention, the below process flow is described in relation to FIGS. 2-5, however, it should be appreciated and understood in accordance with the foregoing description of the invention that other process flows may be implemented for carrying out the present invention.

Step 300.

Start the process flow by a user inputting data relating to an individual (or individuals) that is to be electronically located and/or identified from a given population down to the actual precise person himself/herself to the exclusion of all other people within such population. This data is input by a user at the workstation 10 and transmitted to the database processing system 12 for processing. This information initially includes at least the first name and last name of the individual, along with an address believed to be associated with such individual. This address may an address at which it is believed or known that such individual currently resides or formerly resided. The process flow goes to step 301.

Step 301.

The input data corresponding to the individual that is to be uniquely and singularly identified is first processed within a data processing module 40 of database processing system 12. The data processing module 40 contains one or more processors (e.g., processors 42 and 44) that each translate, validate, verify and scrub the incoming data files. In so doing, the data processing module 40 translates the first and last names and/or address into codes recognized by system 8. Once translated into recognizable codes, the data processing module 40 also validates and verifies the incoming data by making sure that all input data fields contain at least one meaningful value. These validation and verification processes are performed to prevent any erroneous data from entering the database processing system 12. For instance, making sure that the first and last name fields contain at least one alphabetic letter, or making sure that the input address field contains at least one letter and/or number.

Processors of the data processing module 40 also perform a data scrubbing operation to the input data corresponding to the individual being search for to maximize the quality of such data input prior to input into database processing system 12. This data scrubbing operation is a "data replacement" operation that is performed on the first and last name data fields, and on the address field. In one embodiment of the invention, the scrubbing enhances the input first and last name data fields by capitalizing all characters in any "name field", compressing two or more consecutive blank spaces into one single blank character, removing all punctuation marks in any name, removing all title specifications (e.g., MR, MRS, MS, DR, etc.), removing all suffix specifications (e.g., II, JR, $2^{nd}$, etc.) and placing the same into the "SUFFIX" field in a Standardized Template, removing all numeric characters, and the like. Likewise, scrubbing is also performed on the input address fields (i.e., street number, street address, city, state, ZIP code, country code, etc.) to enhance such data. Once the input data is enhanced, the process flow continues to step 302.

Step 302.

All of the enhanced data in the data processing module 40 is then provided in a dispatch queue for obtaining potential matches for the individual being searched for (i.e., the individual that is to be uniquely and singularly identified from a given population). The given population may be a complete population (e.g., the U.S.A. population), a sub-population (e.g., the population of the state of New York), or even a sub-set of a sub-population (e.g., the population within New York City). The queue includes a variety of search terms relating to the individual that is to be searched for in the databases including, but not limited to, the enhanced data name fields, enhanced data address fields, as well as other specific search term requests. In one or more embodiments, the specific search term request of a "No Other Person Request" is included within the queue for determining whether there is no other individual(s) within the searched population that can be the individual that is being searched for since this person is the only one with the name fields and/or address combination being searched. The process flow continues to step 303.

Step 303.

The queue is then uploaded to the Internet/Intranet 23, via interface 16, or even through data loader 14 and then through interface 16, for retrieving search results from a variety of accessible databases 26 et al. on the Internet/Intranet 23. The queue may also be loaded into databases 24 running at or on workstation 10, whereby such databases 24 may be proprietary and contain confidential information. As such, these types of databases are run at or on workstation 10 using computing compatible media, such as, a CD, DVD, CD-ROM, etc., and not over the Internet or intranet. For instance, Federal Death Master File Databases (FDMF) 24 contain confidential information regarding a person's identity (e.g., SSN, DOB, etc.), or even proprietary credit card databases which also include confidential information (e.g., credit card numbers, SSN, DOB, etc.).

In accordance with one or more embodiments of the invention, at least one of the databases searched is a Federal Death Master File Database (FDMF) 24. The Federal DMF database 24 contains numerous files, some of which contain confidential information, and is maintained by the Social Security Department. This data source is used in both "full load," with at least 79 million records, and in "delta updates," which are monthly updated formats. Thus, the Federal DMF is loaded one time only for the full load and then monthly for updates.

FIGS. 4 and 5 show schematic diagrams of the components and process flow of one preferred embodiment of the invention that searches for data relating to the individual that is to be uniquely and singularly identified. In so doing, the queue containing the first and last name fields and at least one potential known address of such individual is input into both the FDMF 24 running at workstation and into Database 26 running on the Internet or an intranet. The process flow continues to step 304 to search these databases for locating any potential matches based on the input queue. Go to step 304.

It should be appreciated and understood that the various embodiments of the invention are not limited to the schematics of FIGS. 4 and 5. Rather, the invention is applicable to any situation wherein it is required that an individual(s) be uniquely and singularly identified to the precise biological person to the exclusion of all others in the population that is being searched. For instance, one or more embodiments may be used to uniquely and singularly identifying an individual(s) to the exclusion of all others in the population for purposes of unclaimed property, credit card approvals and/or usage, fraud prevention, identity theft, financial matters, money laundering, monetary payments and/or debts, law enforcement, medical reasons, genealogical research, amongst various other purposes a person may need to be uniquely identified. As such, the propriety databases 24 and/or publicly available databases 26 may include both confidential and non-confidential information that uniquely identifies each individual (i.e., unique markers) including, but not limited to, SSN, DOB, a property owner tax ID number, a citizenship number, tax ID number, driver's license number, U.S. passport, birth certificate, government certified document that identifies an individual, and the like, or even combinations of or portions thereof any of the foregoing unique markers.

Step 304.

It is then determined whether or not any search results were located in databases 26 input from the Internet/Intranet 23 or other databases 24 that may be proprietary and, as such, input into the system from a disc, CD-ROM, etc. If no search results were located, the process flow returns back to Step 301, or alternatively, the process ends. Wherein the process flow recycles back to Step 301, the data processing module 40 receives notice that no search results were found (i.e., no external data files were located). The input data corresponding to the individual that is to be uniquely and singularly identified is then reprocessed to correct for any translation, validation, verification and/or scrubbing errors that may have occurred, and the process flow continues to step 302. However, if it has been determined that data file search results were located in the databases 24, 26, etc., then the process flow continues to step 305.

Step 305.

The located data file search results from databases 24, 26, etc. are input into the data loader component 14 component via interface 16. These external data files of search results are input into data loader modules of the data loader component 14, such as, data loader modules 32 and 34, to normalize and filter this input data for entry into database processing system 12. Each data loader module is configured with a standard template and a translation table. The standard templates normalize all disparate incoming data formats from the various database inputs into one standardized format that is recognized and used by database processing system 12.

In the event there is any corrupted data files, any incompatible data files, any data load exceptions or rejections, or any data format errors encountered within the incoming data files, the data loader modules 32, 34, etc., output these data errors in log files to the user at workstation 10. These log files safeguard the database processing system 12 from unnecessary resource consumption. The user may input appropriate commands to generate a report based on these log files for examination and determination of whether or not such files contain exceptions, rejected data or true log files. At the user's discretion, the user may then manually enter such data from workstation 10 into database processing system 12 for processing. A runtime error threshold parameter can be specified to abort the data load process if a number of data format errors exceeds the parameter. An excessive number of data format errors generally indicate a corrupted file or changes in the incoming file format.

Referring to the embodiment of FIGS. 4 and 5, data files located from the FDMF database 24 and any data files that match, or potentially match the searched queue, from the database 26 are input into the data loader modules of data loader component 14. These data files are input into an Data Loader Module 34 in a format used by databases of various state agencies. The standard template of the Data Loader Module 34 is set to support this formatting and normalizes all disparate incoming data formats from such various state agencies into one standardized format. In the event the retrieved data files are not compatible with the databases format, data loader 34 outputs such data in log files to the user, whereby the user can view such files and has to option to manually enter them into database processing system 12.

The data files transmitted to the loader module 34 typically include both text and numeric files (e.g., ASCII files). In certain instances, if not already stored in the translation tables of the data loader module 34, translation tables having translation codes (e.g., "Type Code" fields) may need to be obtained from the state government agency transmitting these data files. That is, if the input data is coming from different governmental agencies, each using different proprietary coding schemes, such proprietary coding schemes must be translated into codes recognized and used by system 8. For any failed translation attempts, separate "Translation Exception" files are logged and reported to the user. For those unsuccessful translation attempts, these incoming data records are suspended in the data loader modules 32, 34 until they can be processed at a later time when the required translation tables have been updated.

The FDMF data files from FDMF database 24 are input into a FDMF data loader module 32, which is also configured with both a standard template, corresponding to the FDMF formatting, and with a translation table. Like that described above, the standard template of data loader 32 is used to normalize all incoming FDMF data files from the FDMF database 24 for use by database processing system 12. Any incompatible files are output from data loader 32 for viewing and use by the user. If not already stored in the data loader module 32, translation codes may need to be obtained from the state agency transmitting the FDMF files in order to translate such data into standard internal codes used by the present system 8.

For example, "33" is the "State Country Code" used by the Social Security Administration to indicate that the person's death is reported by the State of New York. As such, a translation table with translation codes is obtained from the Social Security Administration to translate "33" into "New York" for recognition and storage in the database processing system 12. As another example, referring to FIGS. 4 and 5, data fields in an unclaimed property data source transmittal may require translation into codes recognized by the present system 8. These codes may identify the primary business activity of the reporting company, unique codes to distinguish one property type from another, identification of who must claim the property, identification of the type of owner, etc. In the FDMF transmittals, the "State/Country Code" data fields (i.e., state/country from which the death report emanates) may require translation table entries. This code may also indicate the source of the reporting, e.g. "Funeral Home". The processor receiving this normalized data performs translation-table lookups for all available fields. If one or more lookups fail, then the record is suspended and these files are logged and reported to the user.

Once the various database 24, 26 data files have been input into data loader component 14 and normalized for use by database processing system 12, the process flow continues to step 306.

Step 306.

All normalized and/or manually entered data from the data loader component 14 is input into different processor modules (e.g., 42, 44, etc.) of the data processor component 40 of database processing system 12. For instance, referring to the examples of FIGS. 4 and 5, the normalized FDMF data files from data loader module 32 are input into processor 42, while the normalized data files from data loader module 34 are input into processor 44. Each processor module performs validation, verification and scrubbing operations on the corresponding input normalized data files.

Once the normalized data is input into the individual processor modules (e.g., 42, 44, etc.), each processor validates the incoming data to detect, report, and prevent erroneous data from entering the database processing system 12. Each processor performs a number of validating tasks for each and every record input therein. These tasks at least include validating that all required data fields from every input data file contains at least one meaningful value. For instance, referring to FIGS. 4 and 5, wherein the data files are FDMF data files and informational data files, the processors 42 and 44 validate that each file contains at least one meaningful value including, but not limited to, validating that a Tax Identification number includes numeric digits, validating that a person's name (first, middle or last) includes at least one alphabetic letter, validating that property or relationship codes contain a valid and translatable code, validating that a property owner tax ID or date of birth contains only numeric digits, etc.

Any detected errors are generally classified into the following categories: DATA_FATAL, DATA_SUSPENDED, DATA_ERROR or DATA_WARNING. The DATA_FATAL code indicates that no value is available and, as such, the fatal data is removed. DATA_SUSPENDED indicates that a value is available; however, one or more validation fails such that the offending record is suspended and kept in the data loader module. The DATA_ERROR code indicates that data errors/inconsistencies are detected, and warrants further data analysis to determine whether or not there is any impact to the data integrity. The processing of the offending record continues. The DATA_WARNING code indicates that minor data error/inconsistencies have been detected; however, the offending record is processed and there is no potential impact to the data integrity.

Each processor module 42, 44 within the data processing component 40 also verifies that the incoming data is valid and meaningful for purposes of implementing the systems, apparatus and methods of the invention. For instance, in FIGS. 4 and 5 known techniques (e.g., AccuZIP6 software) may be used to verify that the data in the all or both data files include a valid recognizable mailing address (e.g., street address, city, state), verify correct spelling of cities and states, verify valid zip codes, verify delivery and/or check points, verify area codes and time zones, etc. The verification results are imported into database processing system 12, whereby errors and result indicators are incorporated into the overall system error and status reporting.

After the input data is validated and verified, the processors 42, 44 perform data scrubbing operations on such data in order to maximize the quality of the input data prior to the storage and use thereof. As discussed above, data scrubbing enhances the input data fields by capitalizing all characters in any and all data fields (e.g., in the "name fields" and in the "address fields"), compressing two or more consecutive blank spaces into one single blank character, removing all punctuation marks in any data field, removing all title specifications (e.g., MR, MRS, MS, DR, etc.), removing all suffix specifications (e.g., II, JR, $2^{nd}$, etc.) and placing the same into the "SUFFIX" field in a Standardized Template, removing all numeric characters where inappropriate (e.g., numbers are inappropriate in a state name), removing all alphabetic characters where inappropriate (e.g., letters are inappropriate in a zip code), and the like.

At any point during the process flows of the one or more embodiment of the invention, the data fields input into the database processing system 12 may be updated or refreshed. In so doing, system 8 is configured to receive updates to the incoming data fields by periodically implementing a "refresh" operation. For example, the system 8 may assign a unique and periodic refresh cycle identifier, an identification of the data source and the exact state(s) of such data source that is to be refreshed (e.g., "DS-C" and "NJ", identifies a property data set from the state of New Jersey), and a refresh cycle description entered by the user (e.g. "Federal DMF March 2007 Update"). The process flow continues to step 307.

Step 307.

Once all data processing on the data fields input into processors (e.g., 42, 44, etc.) is complete, this processed data is then input into and stored in databases of the database processing system 12. Referring to FIGS. 4 and 5, the processed FDMF files are transferred from processor 42 to the Aggregated FDMF Database 45 for storage therein, while the processed data files from database 26 are transferred from processor 44 to the Consolidate Property Database 46 for storage. In the event there is no data file hits returned from the database 26, then any and all data stored in the FBMF file is sent directly to the Suspect Collection Reconciliation Module 54 of system 8. However, if both or all databases in the database processing system 12 have stored therein return data hits, then the process flow goes to step 308 for comparing such data against one another.

Step 308.

If data is stored in one or more database 45, 46, etc. of processing system 12, then data matching is performed on these processed data fields stored within such databases 45, 46, etc. System 8 includes a data matching module 15 having a Suspect Collection Identification Module 52 and Suspect Collection Reconciliation Module 54. The Suspect Collection Identification Module 52 receives data from at least the processed FDMF files stored in database 45 and from another database within processing system 12 that contains processed information relating to compare the first and last names of individuals listed in database 46 to all deceased persons in the FDMF files to obtain potential matches for the person that is to be precisely and singularly identified from a given population.

For example, wherein property files are being used to precisely identify this person down to the actual biological person, the consolidated property database 46 of FIGS. 4 and 5 provides the Identification Module 52 with the processed property files. The Suspect Collection Identification Module 52 compares this set of data to all located deceased persons in the FDMF to identify a "Suspect Collection" of individuals that may potentially be the precise person being searched for and that may be deceased. The Collection of Suspects is a group of relatively matched data records from the FDMF files that have been matched against data records from at least one other group of processed data files which are linked to the person being searched for (e.g., processed FDMF data files). The data records are relatively matched in Module 52 since the data files output from databases 24, 26 are all potentially linked to the person that is to be identified since the search queue performed therein was executed using only the person's first and last names, optionally the middle name, and at least one potential address for such person. That is, this search typically does not contain a uniquely identifying marker for such person, such as, a SSN, DOB, citizenship number, tax ID number, driver's license number, etc.

Referring again to the embodiment shown in FIGS. 4 and 5, the Aggregated FDMF Database 45 files are compared against the Consolidate Property Database 46 files and are relatively matched to one another in Module 52 to obtain a "Suspect Collection" (i.e., a listing of potential matches). Again, the data is compared using at least the first and last names of the person to be identified and at least one potential address. This list of suspects is then store in a Suspect Collection Database 47 residing on the database processing system 12. Go to step 309.

Step 309.

Once a collection of suspects have been identified by the Suspect Collection Identification Module 52, the listing of data in the "Suspect Collection" database 47 is then input into one or more Individual Search Service Provider (ISSP) data sources 28 via interface 16 and Internet/intranet 23. The ISSP data source 28, or even multiple ISSP data sources, locate matches to the incoming Suspect Collection data, whereby these located matches include at least a first and/or last name that matches the individual being searched for, address(es) or strings (i.e., parts) of address(es) associated with or linked to such matches, and potentially any unique markers that may be used to uniquely and accurately identify the person being searched for. These unique markers located in this ISSP data source search step may include, but are not limited to, a SSN, a DOB, a property owner tax ID, a citizenship number, tax ID number, driver's license number, and the like, or even portions thereof any of the foregoing unique markers. The search results from the ISSP data source 28, along with any located unique markers, are sent to the People Identity Individualization Module 18 via interface 16 and Internet/intranet 23. It should be appreciated that interface 16 utilizes several data exchange and interface techniques to work with one or more ISSP data sources 28 such as, for instance, those supported by ASCII file batch submittals and result returns. The process flow continues to step 310.

Step 310.

The People Identity Individualization Module 18 of system 8 receives the incoming ISSP data for the individualization analysis in accordance with the various aspects of the invention. The "individualization process" implemented by module 18 is based upon a set of matching and comparison tests with relative and absolute scoring algorithms to identify the "best match". Once a "match" is identified and an individual person association is established, various "identifier" data items are compared including, but not limited to, middle name or initial, street number, street name, city, state, zip code, DOB, SSN (either a full or partial match, e.g., first five digits), and the like.

In so doing, the People Identity Individualization Module 18 implements a number of matching analyses using the incoming data from the ISSP sources 28 in combination with data from a Uniquely Identified Individual Database 60 stored in the database processing system 12. This Uniquely Identified Individual Database 60 is a repository of unique identifications of known individuals within a given population. In this Individualization Process, the Individualization Module 18 identifies and associates data records incoming from the ISSP data source 28 to those identified records stored in database 60 for the updating of database 60 with "best matched" results for uniquely and accurately identifying the individual being searched for.

FIG. 5 shows a detailed schematic view of the sub-processes within module 18 for performing the individualization process of one or more embodiments of the invention for uniquely and singularly identifying an individual (i.e., to the fundamental "biological person"). In this sub-process running within Individualization Module 18, search result data records from ISSP data source 28 (step 100) and data from the Uniquely Identified Individual Database 60 (step 102) are obtained, and all of such data is input into the Individualization Module 18 (step 104). The ISSP data record incoming from ISSP data source 28 typically has the following fields: "Last Name", "First Name", and "Middle Name/Middle Initial". The data from these two input sources are then compared against one another to obtain a list or collection of suspects (step 106) that are analyzed to obtain accumulated base-scores (step 108).

Run time parameter operations (step 200) are performed by retrieving base scores and positive match threshold values from a Reference Data Control Table, followed by entering the "Base Score" and "Positive Match Threshold" fields into a processor of Individualization Module 18. Also input into the Individualization Module 18 are data fields of "Last Name", "First Name", and "Middle Name/Middle Initial" parameters from the suspect collection (i.e., each identified potential match for the searched individual). Using standard templates, these incoming data fields are preferably prepared and scrubbed as discussed above in detail (step 202) prior to performing a series of matching and comparison analyses and accumulation of base scores. The standard data loading templates also preferably correctly arrange the name records to provide the "Last Name" field, the "First Name" field, and the "Middle Initial" field.

The Base Score is used to reflect the "amount of contribution" by a given matching comparison test to positively identify the incoming record against the suspect record. The Base Score only has meaning when it is compare to other Base Scores assigned to other tests. The score is calculated by accumulating each "Base Score" awarded and a total possible "Base Score" for tests performed. In order to prevent skewing the scoring algorithm, the "Base Score" is added to the total possible score accumulator only when the test is actually performed (i.e., in the case of an optional test, if either field value is not present, the test is not performed).

The likelihood of positively identifying the incoming record against a collection of suspects is determined using a set of mandatory matching and comparison tests, which use identifiers of the individual's last name and first name, and optionally the middle name or initial as another identifier. Optional, or secondary, tests may also be performed that use optional unique markers for individual, such as, an individual's SSN, DOB, or parts thereof. The mandatory tests include the "Three Name Fields Match test," which has the highest probability of identifying the incoming individual person record, the "Two Out Of Three Name Fields Match test," which has the second highest probability of identifying the incoming individual person record, and the "Last Name SOUNDEX™ Matching test, which has the lowest probability.

For example, a Base Score of 78 can be assigned to the "Three Name Fields Match" test, a Base Score of 60 can be assigned to the "Two-Out-Of-Three Name Fields Match" test, and a Base Score of 42 can be assigned to the "Last Name SOUNDEX Match" test. The "Positive Match Threshold" is a percentage in the range of 0% to 100%. The Positive Match Threshold represents the "minimum degree of matching" (in case of partial matching is supported) that must be achieved before a "positive match" is declared. An example is the incoming record's "Last Name" field contains the value of "JOHNSON" but the suspect record's "Last Name" field is "JOHNSEN", and the "Positive Match Threshold" is set to 75%. In this particular example, the matching comparison test produces a partial match of 86% (six out of a total seven characters match—"J-O-H-N-S-N"). Hence, the entire "Base Score" is awarded. However, if the "Positive Match Threshold" is set at 90%, this particular matching comparison test will be declared failed and the "Base Score" will not be awarded.

Referring now to these mandatory tests, the "Three Name Fields Match" test (step 204). In the three name field test, the "Last Name", "First Name", and "Middle Name/Middle Initial" (optional) fields in the incoming record are compared to the corresponding fields in the "suspect record". Only the "Middle Name/Middle Initial" field is optional in this test. If the "Middle Name/Middle Initial" field in either the incoming record or the "suspect record" is not present, the "Middle Name/Middle Initial" field comparison will not be performed. This test is satisfied if the incoming record's "Last Name" and "First Name", and optionally if provided in both incoming files Middle Name/Middle Initial" field, are compared against one another, and all compared fields match one another. If the "Match Ratio" is not 100%, the "Match Ratio" is then compared to the "Positive Match Threshold". If the "Match Ratio" is equal to or greater than the "Positive Match Threshold", the "Base Score" is then added to the "Accumulate Base Score" (step 210).

The second mandatory matching and comparison test is the "Two-Out-Of Three Name Fields Match" test (step 205). In this test, if two out of three name fields match, then the name fields are parsed and compared to one another by "pairing" name fields (i.e., compare last and first names, compare last and middle name/initials, or even compare first and middle name/initials). In particular, "Last Name" and "First Name" fields from the incoming record to the corresponding fields from the "suspect record" are compared to one another. The "Base Score" parameter is added to a Total Possible Score Accumulator. If the "Match Ratio" is not 100%, the "Match Ratio" is then compared to the "Positive Match Threshold". If the "Match Ratio" is equal to or greater than the "Positive Match Threshold", the "Base Score" is then added to the "Accumulate Base_Score" (step 210). If the "Middle Name/Middle Initial" fields from both incoming record and "suspect record" contain value, then the "Last Name" and "Middle Name/Middle Initial" fields from the incoming record to the corresponding fields from the "suspect record" are compared to one another. The "First Name" and "Middle Name/Middle Initial" fields are also compared to one another. In each of these tests, if performed, the "Base Score" parameter is added to the Total Possible Score Accumulator. Again, if the "Match Ratio" is not 100%, the "Match Ratio" is then compared to the "Positive Match Threshold". If the "Match Ratio" is equal to or greater than the "Positive Match Threshold", the "Base Score" is then added to the "Accumulate Base Score" (step 210).

The "Compressed Name Fields Match" test (step 206) is another mandatory test of the individualization process performed in module 18. In this test, the name fields from the incoming data records are compressed by eliminating all spaces and punctuation prior to conducting the comparison matching (e.g., McDonald as compared to Mc Donald). These compressed records are then compared to the corresponding fields from the "suspect record." Again, the "Middle Name/Middle Initial" field is optional for this test.

Wherein the "Middle Name/Middle Initial" is available for both incoming records and the suspect records, the "Middle Name/Middle Initial" is preferably not concatenated for the "Compressed Name Fields Match". Rather, ASCII string comparisons may be performed with the shortest field length as the comparison length limit. For example, if seven characters exist in the "Last Name" field in the incoming record and nine characters exist in the "Last Name" field in the "suspect record", then comparison is performed with the left-most seven characters in the "Last Name" fields in both incoming record and "suspect record". This partial matching maintains positional integrity of the data (i.e, the positional order of the analyzed data). For example, "JOHNSON" and "JOHNSEN", the comparison shows six characters matched out of a length of seven characters; hence, a "Match Ratio" of 86% is awarded. A second example of "JOHNSON" and "JONESON" shows five out of seven characters matched.

The two other mandatory tests include SOUNDEX™ Matching tests of the last name (step 207) and first name (step 208). In particular, the "Last Name" field from the ISSP data source 28 is compared to the "Last Name" field from database 60, and the likewise, the "First Name" field from the ISSP data source 28 is compared to the "First Name" field from database 60. SOUNDEX™ Matching is a coded name index based on the way a name sounds, rather than the way it is spelled, whereby names that sound the same but are spelled differently (e.g., SMITH and SMYTH) have the same code and are classified as a successful match. The SOUNDEX™ coding is typically provided in a four-character code including a letter followed by three numbers, whereby specific rules are established for such coding. These SOUNDEX™ match tests will only produce either 0% "Match Ratio" (no match condition) or 100% "Match Ratio" (positive match condition). This data is added to the "Accumulate Base Score" (step 210).

In one or more embodiments, the Individualization Process of module 18 may also perform optional, or secondary, tests that use unique person marker identifications input from the ISSP 28 against those found in the Uniquely Identified Individual Database 60. For instance, in one embodiment, the optional tests of the Individualization Process may include the SSN match test that compares the SSN field from the ISSP data source 28 against those found in the Uniquely Identified Individual Database 60. Another optional test is the DOB match test, which compares the birth date field (i.e., year, month and day) from the ISSP data source 28 against those found in the Uniquely Identified Individual Database 60. Again, both of these tests are optional and are performed as a secondary, or back-up test, only if the SSN and the DOB fields are available for both the data coming in from the ISSP database and if available in Database 60.

The Individualization Module 18 then calculates and assigns a Score (step 110) to the Accumulated Base Scores from step 210. These Scores in step 110 are calculated using a "best match" algorithm with defined threshold criteria for "individualizing" multiple records gathered from the ISSP data source 28 in order to identify from the collection of suspect records that record which "best matches" the given individual being searched for. The scoring-based algorithm is implemented in order to fully identify "positively matched cases". The scoring assigns a numerical value in the range of 0 to 100 that reflects the degree of matching for each and every matched data set from the match comparison tests.

The highest scored record for each suspect record that has been processed is retained (step 112), followed by determining whether or not any more suspects exist in the Uniquely Identified Individual Database 60 for processing in accordance with this individualization process (step 114). That is, the matching and comparison step 108 may be run for each and every suspect (i.e.; individual) record in Database 60. If more suspect records exist, the process flow goes back to the matching and comparison step 108.

Once no further suspect records exist (i.e., all have been examined for matching and comparison) it is then determined for each scored record whether or not it exceeds a "Minimum Score Threshold" value (step 116). If the suspect record's score is equal to or greater than the "Minimum Score Threshold", then a match is found for this suspect record (which must have originally existed in Database 60 at the beginning of the Individualization Process), and the Uniquely Identified Individual Database 60 is updated with this current best match (highest scored) record (step 118). If the suspect record's score is less than the "Minimum Score Threshold", the suspect record is a new record for a new individual (person) that did not exist in Database 60 at the beginning of the Individualization Process, and the Uniquely Identified Individual Database 60 is updated with the record for this new individual (step 120).

It should be appreciated that with the various aspects of the invention the foregoing Individualization Process steps may be run for all suspect records in database 60 in batch mode. For example, the suspect records may be obtained using a Federal DMF database (repository) that contain propriety information (i.e., SSN's) and are provided on computer readable media at monthly intervals, such that, the Individualization Process is performed as monthly batch updates for a group or plurality of records identify various individuals on the Federal DMF for that month. As an alternative example, the Individualization Process may be performed for a single record that identifies one specific person, whereby the suspect record for this one specific person is obtained from a public or private database for accomplishing a singular task (e.g., fraud protection or identity theft purposes). In this aspect, the Individualization Process is performed as needed (e.g., monthly, daily, hourly, etc.)

Step 311.

Once the Individualization Process is finished in Individualization Module 18, all current best match (highest scored) records (step 118) and new records for new individuals (step 120) are updated in the Uniquely Identified Individual Database 60. Again, these updates in Database 60 are based on suspect records (i.e., data records) containing an individual's (or group of individuals') last and first names and their one time known address(es) that have been submitted to the ISSP 28 data source. The ISSP 28 may return multiple "best matched" results for every submitted suspect record. For example, the suspect record submitted to the ISSP may be "John Doe one time resided at 123 South Main Street, Los Angeles, Calif." The ISSP may return the following results based on use of the ISSP's "best matched" algorithm:

John Doe at 123 S. Main St. Los Angeles, Calif. 90012 with SSN of "123456789" and partial Birth Date of "12/XX/1945".

Johnnie Doe at 123 S. Main St. #A2, Los Angeles, Calif. 90012 with partial SSN of "12345XXXX" and no Birth Date information.

Johnny M. Doe at 123 Main Street, Los Angeles, Calif. 90012 with partial SSN of "45423XXXX" and partial Birth Date of "07/XX/1969".

The People Identity Individualization Module 18 then takes this data result set from the ISSP and applies individualization "best matched" algorithms (step 110) of this individualization process to arrive at the below two "biological units" of individuals in the result data set. Module 18 eliminates data results by applying the comparison and matching tests, whereby since data results numbers 1 and 2 have name fields, address fields, and SSN fields that match by at least 5 strings in each one, then these data results must identify the same biological person, and as such, the data result set with the most information is retained (i.e., data result set number 2 is deleted) as set forth below:

1A. John Doe with an AKA of Johnnie at 123 South Main Street, #A2, Los Angeles, Calif. 90012 with a full SSN of "123456789" and partial Birth Date of "12/XX/1945".

3A. Johnny M. Doe at the same address with a partial SSN of "45423XXXX" and partial Birth Date of "07/XX/1969".

In view of the foregoing results of this example, the below discussed Suspect Collection Reconciliation Module 54 may conclude that the elder John Doe MAY BE the father of Johnny M. The process continues to step 312.

Step 312.

Once the Uniquely Identified Individual Database 60 has been updated with currently available suspect data records, the Suspect Collection Reconciliation Module 54 component of system 8 is implemented to provide outputs for singularly and uniquely identifying the individual being searched for within the searched population to the exclusion of all other individuals within such population. These outputs electronically identify the searched individual(s) down to the actual biological person himself/herself to the exclusion of all others for subsequent use by the user of the invention or by others in need of such information. The Suspect Collection Reconciliation Module 54 receives inputs from the Uniquely Identified Individual Database 60, the Suspect Collection Database 47 and the Aggregated FDMF Database 45.

The Suspect Collection Reconciliation Module 54 analyzes all of this input data to first determine the records of all interested individuals (or suspects) in the "Property Owners" that have been successfully identified by Database 60. Again, Database 60 is a data collection of unique "biological units" of individuals with some degree of identity attributes that include the individual's first and/or last name, street address information, and optionally full or partial SSN's and DOB if these parameters were searched for and/or located in the search. For instance, the Suspect Collection Reconciliation Module 54 compares input first and last names, addresses, SSNs, DOBs from the "best matched" data input from Database 60 against the same record fields from the Aggregated FDMF and Suspect Collection Databases 45, 47, and if a match of the first and last names and full SSN is found, then the interested subject is declared "Sure Dead" and this information is stored in the Sure Dead Database 70. However, if only a partial SSN exists, all matched records in the Aggregated FDMF Database are extracted to confirm the full SSN for confirmation that the individual is in fact in the "Sure Dead" list.

In the event an interested individual(s) (suspects) is fully identified in Database 60; however, such interested individual(s) record does not match to a record in the Federal DMF database 45, then this record of the interested individual(s) remains in Database 60 to be compared again when the processes of the invention are run again (e.g., when the monthly Federal DMF update is received.) Whenever an update for the "Federal DMF" is received, the Suspect Collection Reconciliation Module 54 automatically invokes Workflow Manager 22 for implementing the one or more embodiments of the invention.

In one or more embodiments of the invention, the Reconciliation Module 54 preferably performs a three-part matching test that all must be satisfied for a positive matched case to be identified, stored in Database 70 and ultimately reported to the user. The three-part matching processes include a "direct person" match, an "ABC pattern" match and a "no other person" match.

The "direct person" match requires that a full or partial SSN of the individual being searched for is available from both the Aggregated FDMF Database 45 and the Uniquely Identified Individual Database 60, and that such records match. Referring to FIGS. 4 and 5, the "direct person" match is satisfied if the last name, first name, and middle initial of the individual in the record exactly matches the corresponding names in the Federal DMF files, and full or partial SSN of the property owner matches exactly the SSN of the same record in the Federal DMF. In situations where there is not a direct and positive match for such records, the Suspect Collection Reconciliation Module 54 implements the below reconciliation processes in order to declare a positive matched case of the individual in the record.

The "ABC pattern" match is satisfied if the last name, first name, and at least the middle initial, of the individual in the record matches the corresponding names stored in records of both the Uniquely Identified Individual Database 60 (which is derived from ISSP data source 28) and the Aggregated FDMF Database 45. In the "ABC pattern" match the postal delivery code (i.e., "Carrier Route", "Delivery Point", and "Check Digital" data items) or partial address fields (e.g., street Number, name, directional prefix, street postfix, city name, state, zip code) for the individual in the record must also positively matches those in the Uniquely Identified Individual Database 60. In the "ABC pattern" match, if a record from Database 60 can be located with the name and postal delivery/address conditions satisfied, the SSN field is then extracted from this database record if it is available. The extracted SSN is used for full or partial (minimum of the first five digits) match against the SSN in the Aggregated FDMF Database 45, and if positively matched, the "ABC pattern" match is satisfied.

The "no other person" match is satisfied by the process of elimination, whereby if a unique name only appears once in all three data sources with an identical SSN from both Uniquely Identified Individual Database 60 and Aggregated FDMF Database 45, then it is classified as a positive match. That is, the conditions for the "no other person" match are met if there is only one record occurrence with the given "Last Name" and "First Name" in the data and in Databases 45 and 60, and if the SSN matches in Databases 45 and 60.

For instance, in the "no other person" match, if there is one person who ever lived in the USA with the first name "XXX" paired with the last name "YYYYYY," then any record found for an individual named "XXX YYYYYY" MUST be the precise biological person "XXX YYYYYY." Any of these types of record input into the Reconciliation Module 54 from the Suspect Collection 47 database are flagged as a potential candidate for the NOPM match since the initial queue is run with this special request therein. The ISSP 28 also executes its search using such request, and the Individualization Module 18 performs the individualization processes on such data. In the event that during an individualization process run in module 18 it is found that record has been received which contains a different SSN, and this record is used to update the Uniquely Identified Individual Database 60, then the designation of "no other person" match is removed from Database 60. The "no other person" match is enforced in the Reconciliation Module 54 since this module performs matching therein based on the input records that have been searched and processed based on these "no other person" terms.

It should also be understood that since the Reconciliation Module 54 is executed using data records processed in accordance with the embodiments of the invention, which have been subjected to data correction matching processes and/or scoring matching processes, then this Reconciliation Module 54 is implemented using such correct data and/or scored matching processes. For instance, along with Module 54, Module 18 also implements corrected data algorithms to normalize, edit and/or correct for missing data within the already searched records, or even for those records that are to be searched. One example is if a zip code is missing in an address field of a record, then an algorithm may be implemented to obtain and insert the missing zip code into the address field of such record. Scored matching is also performed and discussed in detail above in relation to process flow step 310. Go to step 313.

Step 313.

The data set results from the Suspect Collection Reconciliation Module 54 are stored in Database 70 of the database processing system 12. Referring to FIG. 4, this Database may be a Sure Dead Collection Database 70. Go to step 314.

Step 314.

It is then determined if any other individual or individuals are to be uniquely and singularly identified down to the precise biological person in accordance with the embodiments of the invention. If not, then the process stops. If more processing is required or desired, the flow recycles back to the beginning data relating to another individual (or additional individuals) that is to be electronically located and/or identified from a given population down to the actual precise person himself/herself to the exclusion of all other people within such population.

In all embodiments of the invention, the systems, methods and program products may be implemented to refresh the present process runs (e.g., at the user's discretion, at set intervals, etc.), at any stage within a run, such as, through a "data refresh cycle." Thus, as shown by the foregoing description, the systems, methods and program products of the various embodiments of the invention are configured to accurately identify a distinct person at the most elementary level (individual or a.k.a. "biological person") thereby assuring data integrity and accuracy in positively matched cases.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

Thus, having described the invention, what is claimed is:

1. A method for positively identifying an individual comprising:
   inputting into a computing device the name of an individual to be uniquely identified within a population to the exclusion of all others within said population;
   a suspect collection identification module in communication with the computing device, the suspect collection identification module generating a collection of preliminary suspects by retrieving data from at least two different and unique sources of data having data in a common format, performing a data scrubbing operation on the data to provide scrubbed data, comparing the scrubbed data from the at least two different and unique sources of data against each other based on said name of said individual, and further including updating said data in said at least two different and unique sources of data;

obtaining from the suspect collection identification module at least one potential match from the collection of preliminary suspects;

a people identity individualization module comparing the at least one potential match against data from at least one of said different and unique data sources to locate at least a partial unique identifier that may be associated with said individual;

a suspect collection reconciliation module comparing said at least one potential match and said at least partial unique identifier with other data records within said at least one individual search data source for locating a full unique identifier that may be associated with said individual; and verifying that the full unique identifier identifies said individual to the exclusion of all others within said population.

2. The method according to claim 1 wherein the step of providing at least two different and unique sources of data that contain data pertaining to a population of biological persons includes the steps:

retrieving data from the at least two different and unique data sources; and normalizing the retrieved data into a standardized and common format.

3. The method according to claim 2 further comprising the step of validating the scrubbed, normalized data.

4. The method according to claim 3 further comprising the step of storing the validated data.

5. The method according to claim 1 wherein the step of comparing the at least one potential match having said at least partial unique identifier associated therewith with other persons' data records in the additional database comprises the step of implementing at least one comparison test.

6. The method according to claim 5 wherein the data representing the at least one potential match comprises a last name field, a first name field and a middle initial field and the at least one comparison test comprises a three-name-field matching test wherein the last name field, first name field and middle initial fields are compared to corresponding last name field, first name field and middle initial field, respectively, in the data records retrieved from the at least one individual search data source.

7. The method according to claim 6 wherein the at least one comparison test comprises a plurality of comparison tests and another one of the at least one comparison test comprises a two-out-of-three name fields matching test.

8. The method according to claim 7 wherein the two-out-of-three name fields matching test is not implemented when there is no middle initial or middle name field provided either in the data records of the potential match or the data records retrieved from the at least one individual search data source.

9. The method according to claim 7 wherein the at least one comparison test further comprises a compressed name field match test that comprises the steps of:

compressing the last name, first name and middle initial or middle name, when provided, of the at least one potential match and the person or person's data records retrieved from the additional database so as to eliminate all spaces and punctuation; and comparing the compressed last, first and middle initial or middle names of the at least one potential match and the person or person's data records retrieved from the at least one individual search data source.

10. The method according to claim 9 wherein the at least one comparison test further comprises a sound comparison test which compares the sound of the pronunciation of the person's name designated as the potential match and the person's name defined by the data records retrieved from the at least one individual search data source.

11. The method according to claim 1 wherein said full unique identifier is selected from the group consisting of a social security number, a date of birth, a driver's license number, a Medicare identification number, and a tax identification number.

12. The method according to claim 1 wherein one of the at least two different and unique sources of data comprises data records of all deceased individuals.

13. The method according to claim 1 further including the step of providing at least one address believed to be associated with said individual for uniquely identifying said individual.

14. The method according to claim 1 further including the step of indicating that said potential match is said individual that is to be uniquely identified.

15. The method according to claim 1 wherein said step of determining whether said full unique identifier uniquely identifies said individual includes validating and verifying said full unique identifier and said full unique identifier's correlation to said individual that is to be uniquely identified.

16. A method for singularly identifying an individual comprising the steps of:

(a) providing a plurality of data bases, each data base containing a unique category of data pertaining to a population of individuals;

(b) inputting into a computing device search data that comprises information that is associated with an individual that is to be uniquely electronically identified to the exclusion of all others within said population;

(c) generating a collection of preliminary suspects by a suspect collection identification module in communication with the computing device retrieving data from at least two different data bases of the plurality of data bases having data in a common format, performing a data scrubbing operation on the data to provide scrubbed data, comparing the scrubbed data against each other based on said name of said individual to find additional information that may be related to the information defined by the search data, and further including updating said data in said plurality of data bases;

(d) obtaining from the suspect collection identification module at least one potential match from the collection of preliminary suspects;

(e) a people identity individualization module comparing the at least one potential match against data from at least one of said plurality of data bases to locate at least a partial unique identifier that may be associated with said individual;

(f) a suspect collection reconciliation module comparing said at least one potential match and said at least partial unique identifier with other data records within said plurality of data bases for locating a full unique identifier that may be associated with said individual;

(g) determining whether the full unique identifier constitutes a unique identifier of said individual that identifies said individual to the exclusion of all others within said population or whether the full unique identifier constitutes generic, personal, identifiable information;

(h) indicating that the full unique identifier singularly identifies said individual when the full unique identifier constitutes said unique identifier of said individual that identifies said individual to the exclusion of all others within said population;

(i) revising the search data to replace a portion of the search data with all or a portion of the additional information when the additional information is not said unique identifier of said individual but instead is generic, personal, identifiable information; and (j) repeating steps (c)-(i).

17. A program storage device readable by a processor for executing instructions, tangibly embodying a program of instructions executable by the processor to perform steps for positively identifying an individual comprising:

inputting into a computing device the name of an individual to be uniquely identified within a population to the exclusion of all others within said population;

providing at least two different and unique sources of data that contain data pertaining to said population;

providing access to at least one individual search data source;

a suspect collection identification module in communication with the computing device comparing data from said at least two different and unique sources of data against each other based on said name of said individual to provide a collection of preliminary suspects, the suspect collection identification module providing the collection of preliminary suspects by retrieving data from said at least two different and unique sources of data having data in a common format, performing a data scrubbing operation on the data to provide scrubbed data, comparing the scrubbed data against each other based on said name of said individual, and updating the data within the at least two different and unique sources of data;

obtaining from the suspect collection identification module at least one potential match from the collection of preliminary suspects;

verifying and validating said at least one potential match by a people identity individualization module comparing the at least one potential match against data from at least one of said plurality of data bases to locate at least a partial unique identifier that may be associated with said individual;

reconciling said at least one potential match with data from at least one of said different and unique data sources for locating at least said partial unique identifier that may be associated with said individual that is to be uniquely identified; and a suspect collection reconciliation module comparing said at least one potential match and said at least partial unique identifier with other data records within said at least one individual search data source for locating a full unique identifier that may be associated with said individual that is to be uniquely identified.

18. A non-transitory computer program product comprising:

a non-transitory computer usable medium having computer readable program instructions embodied therein for positively identifying an individual, said non-transitory computer program product having:

first program instructions to provide the name of an individual to be uniquely identified within a population to the exclusion of all others within said population;

second program instructions to provide at least two different and unique sources of data that contain data pertaining to said population;

third program instructions to access to at least one individual search data source;

fourth program instructions to compare data from said at least two different and unique sources of data against each other based on said name of said individual to provide a collection of preliminary suspects, said fourth program instructions for providing said collection of preliminary suspects including instructions to retrieve data from said at least two different and unique sources of data having data in a common format, to perform a data scrubbing operation on the data to provide scrubbed data, to compare the scrubbed data against each other based on said name of said individual, and to update the data within the at least two different and unique sources of data;

fifth program instructions to search said at least one individual search data source for additional data relating to said collection of preliminary suspects for locating at least one potential match;

sixth program instructions to verify and validating said at least one potential match;

seventh program instructions to reconcile said at least one potential match with data from at least one of said different and unique data sources for locating at least a partial unique identifier that may be associated with said individual that is to be uniquely identified;

eighth program instructions to compare said at least one potential match and said at least partial unique identifier with other data records within said at least one individual search data source for locating a full unique identifier that may be associated with said individual that is to be uniquely identified; and ninth program instructions to determine whether said full unique identifier uniquely identifies said individual to the exclusion of all others within said population, wherein the first through ninth program instructions are all stored on the computer readable storage media.

* * * * *